United States Patent
Filippi et al.

(10) Patent No.: US 11,369,930 B2
(45) Date of Patent: Jun. 28, 2022

(54) WALLS FOR CATALYTIC BEDS OF RADIAL- OR AXIAL-FLOW REACTORS

(71) Applicant: CASALE SA, Lugano (CH)

(72) Inventors: Ermanno Filippi, Castagnola (CH); Enrico Rizzi, Casnate con Bernate (IT); Mirco Tarozzo, Ligornetto (CH)

(73) Assignee: CASALE SA, Lugano (CH)

( * ) Notice: Subject to any disclaimer, the term of this patent is extended or adjusted under 35 U.S.C. 154(b) by 0 days.

(21) Appl. No.: 16/085,116

(22) PCT Filed: Mar. 7, 2017

(86) PCT No.: PCT/EP2017/055239
§ 371 (c)(1),
(2) Date: Sep. 14, 2018

(87) PCT Pub. No.: WO2017/157717
PCT Pub. Date: Sep. 21, 2017

(65) Prior Publication Data
US 2019/0076805 A1  Mar. 14, 2019

(30) Foreign Application Priority Data
Mar. 16, 2016 (EP) .................... 16160701

(51) Int. Cl.
*B01J 8/02* (2006.01)
(52) U.S. Cl.
CPC ........... *B01J 8/0214* (2013.01); *B01J 8/0278* (2013.01); *B01J 2208/0092* (2013.01); *B01J 2208/00938* (2013.01); *B01J 2219/1943* (2013.01)

(58) Field of Classification Search
CPC ............... B01J 8/0214; B01J 8/0278; B01J 2219/1943; B01J 2208/00938; B01J 2208/0092
(Continued)

(56) References Cited

U.S. PATENT DOCUMENTS 2,639,224 A  5/1953  Jerry
2,683,654 A  7/1954  Bergman
(Continued)

FOREIGN PATENT DOCUMENTS

EP  2014356 A1  1/2009
JP  S60137431 U  7/1985

OTHER PUBLICATIONS

International Preliminary Report on Patentability for International Application No. PCT/EP2017/055239 completed Jun. 12, 2018.
(Continued)

*Primary Examiner* — Huy Tram Nguyen
(74) *Attorney, Agent, or Firm* — Dorsey & Whitney LLP

(57) ABSTRACT

Radial or axial-radial flow catalytic chemical reactor comprising a cylindrical shell and at least one catalytic bed and comprising a plurality of perforated tubes, said tubes having an open end communicating with an inlet of a gaseous flow of reagents in the reactor, said tubes being provided with a plurality of holes on their side surface, said tubes being arranged around the catalytic bed so as to form an outer wall which bounds the catalytic bed and which distributes the reagents inside said bed; each of said tubes being formed by means of longitudinal or helical butt welding of a perforated strip.

12 Claims, 5 Drawing Sheets

(58) Field of Classification Search
USPC .......................................................... 422/118
See application file for complete search history.

(56) References Cited

U.S. PATENT DOCUMENTS

| | | | | |
|---|---|---|---|---|
| 3,293,403 | A * | 12/1966 | Rudd | ................. B23K 11/0873 |
| | | | | 219/102 |
| 3,314,141 | A * | 4/1967 | Bacroix | .................. B21C 37/12 |
| | | | | 219/62 |
| 4,374,095 | A | 2/1983 | Legg et al. | |
| 5,202,097 | A | 4/1993 | Poussin | |
| 6,892,928 | B2 * | 5/2005 | Tanaka | .................... B21C 37/06 |
| | | | | 228/114 |
| 7,842,257 | B2 * | 11/2010 | Fecteau | .................. B01J 8/0035 |
| | | | | 422/211 |
| 8,192,688 | B2 * | 6/2012 | Hagen | ....................... F23R 3/28 |
| | | | | 422/129 |
| 2004/0091404 | A1 | 5/2004 | Ablin | |
| 2009/0155144 | A1 | 6/2009 | Fecteau | |

OTHER PUBLICATIONS

International Search Report and Written Opinion for International Application No. PCT/EP2017/055239 dated May 29, 2017.

* cited by examiner

WALLS FOR CATALYTIC BEDS OF RADIAL- OR AXIAL-FLOW REACTORS

FIELD OF APPLICATION

The invention relates to the field of chemical reactors comprising a catalytic bed passed through by a radial or axial-radial flow.

PRIOR ART

Radial or axial-radial flow chemical reactors are known in the art. In a radial reactor, the gaseous flow passing through the catalytic bed is substantially radial; in an axial-radial reactor, instead, the catalytic bed is open at the top so that a portion of gas may enter into the bed and pass through it axially. The catalytic bed typically has an annular cross-section. The radial flow may be directed towards the centre (inward) or towards the outside (outward).

In said radial or axial-radial flow reactors it is necessary to provide suitable walls for containing the catalytic bed and it is also necessary to install means for distributing or collecting the gaseous flow of reagents along the outer cylindrical wall of the bed. Said outer wall of the bed, therefore, must ensure both containment and suitable mechanical support for the catalytic mass and at the same time must be permeable to the flow of the reagent gases.

Systems which comprise a plurality of walls performing these functions are known. For example, EP 2 014 356 describes a double-wall containment system for a catalytic bed, comprising a first containment wall in contact with the catalyst and gas permeable due to the presence of slits formed, for example, by milling, water-jet cutting or electro-erosive machining, and a second perforated wall situated around the first wall and with the function of distributing the gas. Said system offers a series of recognized advantages, but involves a certain cost for the realization of the double wall and the slits on the wall in contact with the catalyst.

Another known constructional solution comprises shaped headers, known as "scallops", which are characterized by a flattened cross-section having different radius of curvature on the shell-side (back) and on the catalyst-side (front), respectively.

In greater detail, a scallop header typically comprises a substantially flat back, directed towards the shell, and a front portion having a semi-circular shape, and said scallop header is perforated only on said front portion. From a constructional point of view, the scallop headers of the known type generally have a longitudinal weld along the back, said weld being realized manually using the fillet-welding technique, i.e. by overlapping two sheet-metal edges and realizing the weld along the step formed by the two overlapped edges.

The scallop headers are relatively widespread and are popular for example because of their small dimensions which facilitate their insertion into the reactor and their assembly, but have the drawback of a high cost since they are non-standard components which must be specifically made for each reactor, using specialized machinery with a limited degree of automation (manual or at the best semi-automatic machines), this resulting in relatively high costs. In particular, the execution of the aforementioned manual weld along the back of the scallop requires labour and involves a considerable cost.

In order to better understand the above, reference may be made to FIGS. 7 and 8 which show a typical scallop header 100 comprising a front part 101 and a back part 102. Only the front part 101 is perforated. The back 102 is formed by two sheet-metal edges 103 and 104 which overlap in a zone 106 where a fillet weld 105 is performed (FIG. 8). This welding method is typically manual and is performed in particular on small-thickness metal sheets where a butt weld (without edges overlapping) cannot be performed manually. It should be noted that the cross-section is substantially symmetrical only relative to an axis Y, while it is asymmetrical relative to any axis perpendicular to said axis Y, owing to the different shape of the front part 101 and the back 102.

SUMMARY OF THE INVENTION

The invention aims to overcome the drawbacks of the prior art mentioned above and in particular to provide a less costly method for forming walls of radial or axial-radial catalytic reactors of the type considered here, while satisfying the requirements of a uniform distribution of the reagent gases and performing a containment and mechanical support function for the catalytic mass.

This object is achieved with a radial or axial-radial flow chemical reactor according to claim 1.

A reactor according to the invention comprises a plurality of perforated tubes which are in a ring arrangement and define a gas-permeable wall, for example a distributor of gas in the catalytic bed. Each of said tubes is made from a perforated strip or a perforated metal sheet, and comprises a main butt weld performed by means of an automatic welding process. Said main weld is understood as being a weld which gives the starting strip or sheet a tubular form.

The tube has preferably a small thickness. Preferably the thickness of the tube is not greater than 3 mm. More preferably, said thickness of the tube is not greater than 1.5 mm and even more preferably it is comprised between 1 mm and 1.5 mm, for example 1.2 mm.

The expression "automatic welding process" denotes welding performed by automatic machines, without manual assistance.

In a first embodiment of the invention, each perforated tube is made by helically winding up a perforated strip, and said weld follows a helically welding line. For example, in a preferred embodiment, a perforated sheet-metal strip is helically wound, and then automatic welding is performed along the helically wound line thus defined. Helical winding is preferably performed by means of a forming process, where the strip is pushed through a series of rollers or moulds which gradually deform the strip.

In a second embodiment, said weld along each tube is a longitudinal straight weld.

The preferred material for the tubes is stainless steel, for example AISI 321 or AISI 304. In some applications an alloy, for example a nickel-chromium alloy, is preferred. More particularly, the nickel-chromium alloys known by the trademark Inconel are preferred for use in ammonia reactors.

The tubes may have a circular or other than circular cross-section, according to different embodiments. In particular, tubes with a non-circular cross-section have preferably a flattened or oval cross-section and, more preferably, an elliptical or substantially elliptical cross-section. Cross-sections other than the circular cross-section preferably have two axes of symmetry which are perpendicular to each other.

Tubes with circular cross-section may be obtained by means of helical welding or straight welding along a generatrix of the cylinder which represents said tube. An advantageous manner for obtaining tubes with elliptical cross-section comprises a forming process followed by longitudinal welding.

Preferably, the wall thickness of the tubes, i.e. the thickness of the starting perforated strip or metal sheet, is small compared to the diameter or the cross-sectional perimeter of the tubes.

For tubes with a circular cross-section, preferably the wall thickness is related to the diameter. According to a preferred embodiment, the ratio between the wall thickness and the diameter of the tubes is lower than or equal to 1/10, and even more preferably is lower than or equal to 1/20.

For tubes with non-circular cross-section, the wall thickness may be related to the perimeter of the cross-section. In the case of elliptical cross-section, the perimeter is also called elliptical circumference. According to preferred embodiments, said ratio between the wall thickness and the perimeter of the cross-section is lower than or equal to 1/30, and even more preferably is lower than or equal to 1/60.

According to another aspect of the invention, conical tubes with progressively variable diameter are made by means of a straight welding along a generatrix of the cone. Said conical tubes may have a diameter decreasing from the inlet of the reagent gases towards the end of the tube, so as to compensate for the flowrate variation along the tube and keep constant or substantially constant the speed of the gases within the tube. In fact the flowrate is maximum at the inlet of the tube and decreases along the tube itself since a gas portion flows out through the side holes.

In the various embodiments of the invention, said tubes preferably have holes with a diameter of at least 1 mm and more preferably not greater than 5 mm, for example equal to 3 mm. It should also be noted that the perforated tubes have holes distributed uniformly or substantially uniformly over their side surface, differently for example from scallop headers which only have holes over their front surface, and not over their back. In some embodiments, the distance between the holes may be increased along the welds of the end flanges.

In some embodiments, the reactor comprises at least one ring (reinforcement ring) for supporting and keeping said tubes in position.

A further aspect of the invention consists in the use of commercially available and serially-produced tubes. One feature of said commercial tubes is represented by the automatically formed welds, which denote a serial production. More preferably, said commercial tubes are soil drainage tubes, which are widely available at a very low cost.

A preferred application of the invention concerns reactors for ammonia or methanol synthesis.

Another aspect of the invention relates to the use of perforated tubes for the realization of a wall for catalytic beds of radial or axial-radial flow reactors, said perforated tubes having the characteristics described above. Another aspect of the invention relates to a wall for catalytic chemical reactors, comprising a plurality of perforated tubes with the characteristics described above.

Another aspect of the invention relates to a method for realizing a gas-permeable wall in a catalytic bed for radial or axial-radial flow chemical reactors, the method being characterized in that said wall is formed by perforated tubes and said perforated tubes are realized by means of helical or straight welding of a perforated strip or a metal sheet.

The main advantage of the invention consists in the low-cost production which does not require special machinery. The helical or straight welding of perforated strips may be performed using completely automatic machines, thus reducing significantly the manufacturing costs compared, for example, to the costs for producing scallop headers.

The invention has the advantage of realizing the walls of the headers using small-size elements, which can be introduced into the reactor through a small manhole; therefore they also can be used in reactors with partial opening, which do not have an opening with the same diameter as the vessel. Moreover, the walls of the headers can be assembled while limiting the number of welds performed inside the reactor, thus reducing the downtimes and costs.

The perforated tubes, in a reactor or wall according to the invention, have a helical or longitudinal butt weld performed on a small thickness using automatic machines (e.g. welding robots). Known headers, instead, typically have a manual fillet weld, with edges overlapping, which is more costly and potentially more prone to defects.

The applicant has also found that a wall for catalytic beds according to the invention, despite the low cost, ensures good distribution of the reagent gas flow inside the respective catalytic bed and provides proper mechanical support.

The advantages will emerge even more clearly with the aid of the detailed description below relating to a preferred embodiment of the invention provided by way of a non-limiting example.

DETAILED DESCRIPTION

Figure 1:
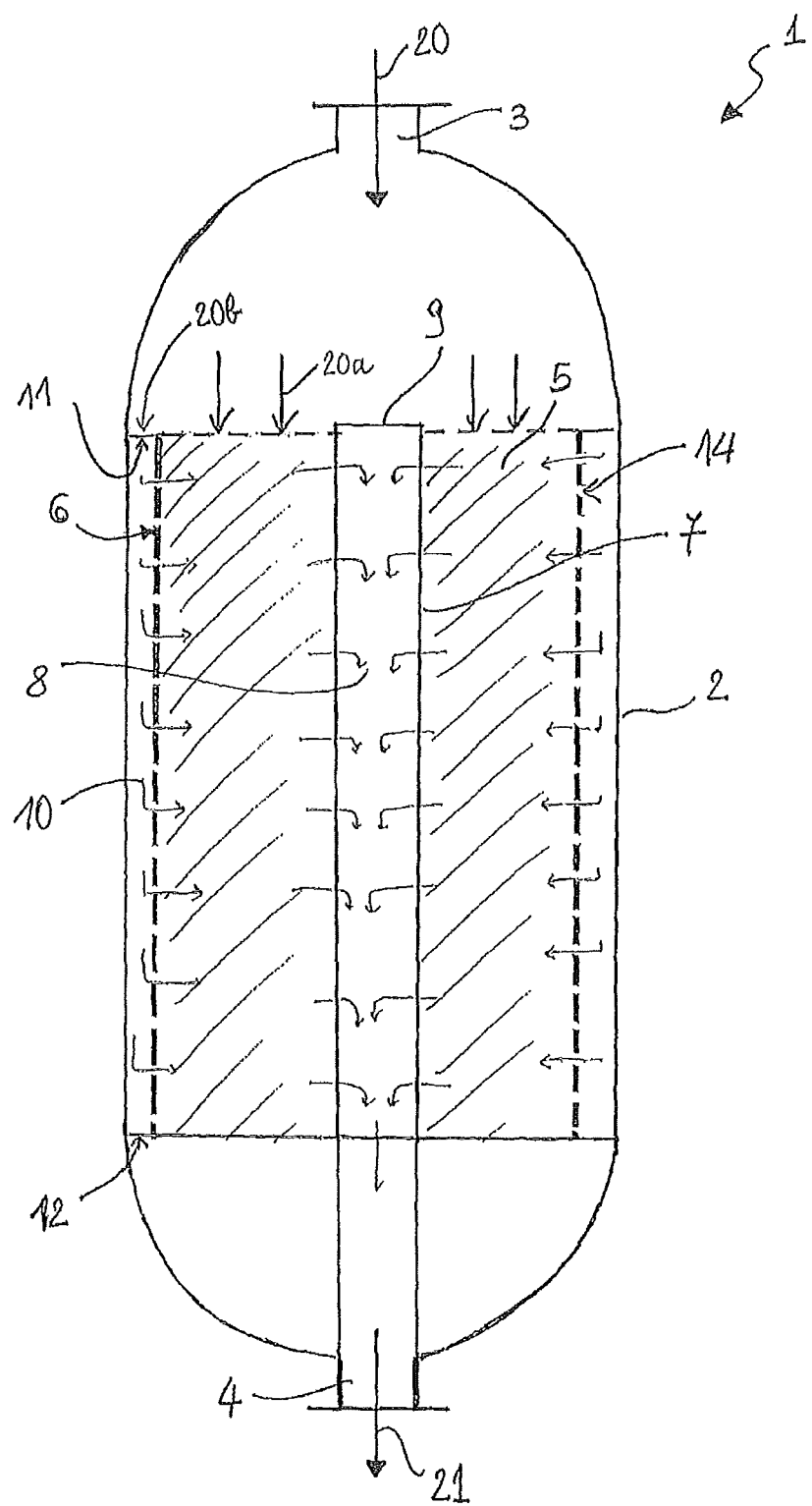
FIG. 1 shows in schematic form a longitudinally sectioned view of an axial-radial reactor according to an embodiment of the invention.

FIG. 1 shows a catalytic chemical reactor 1, for example a reactor for the synthesis of ammonia from a synthesis gas comprising hydrogen and nitrogen.

The reactor 1 comprises a substantially cylindrical shell 2 provided at the top end with an inlet opening 3 for reagent gases 20 and at the bottom end with an outlet opening 4 for a gaseous flow 21 comprising the reaction products.

The reactor 1 contains a catalytic bed 5 with annular cross-section passed through by an axial-radial flow.

Said catalytic bed 5 is delimited by an outer wall 6 in the vicinity of the shell 2 and an inner wall 7, for the inlet and outlet of the gases into/from the bed 5, respectively.

Moreover, the catalytic bed 5 is open at the top so as to allow a first portion 20a of the reagent gas flow to pass axially through it.

Figure 2:
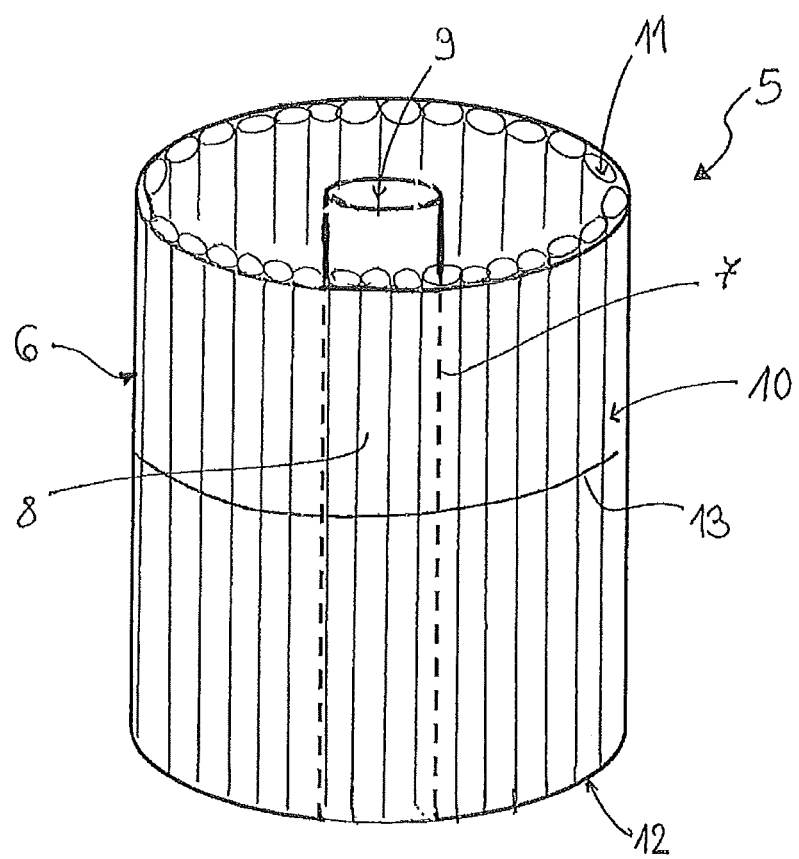
FIG. 2 shows in schematic form a perspective view of the catalytic bed of the reactor according to FIG. 1.

The wall 6 is formed by perforated tubes 10 in a ring arrangement, for example along a circumference. Said tubes 10 have an open top end 11 for the entry of a second portion 20b of the gas flow 20 and a closed bottom end 12. The tubes 10 may be advantageously supported and kept in position by at least one ring 13 (FIG. 2). Said ring 13 is preferably arranged at the top end of the tubes. Further means for supporting the tubes, in some embodiments, consist of a series of supports or guides welded to the walls of the reactor 1.

The tubes 10 comprise a plurality of holes 14 arranged uniformly along their side surface, in a respective hole arrangement, so as to supply the second gaseous portion 20*b* to the catalytic bed 5, with an essentially radial flow.

Said holes 14 have dimensions such as to allow the free passage of the reagent gas, and not of the catalyst of the catalytic bed 5, through them. Preferably said holes are substantially circular and have a diameter of 3 mm.

Each tube 10 is made from a perforated strip with helical or longitudinal welding.

Figure 3:
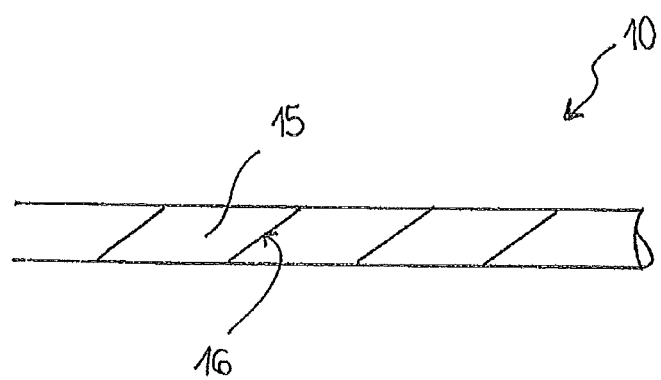
FIG. 3 shows in schematic form an embodiment of a perforated tube of the catalytic bed according to FIG. 2.

FIG. 3 shows a tube 10 made by helical winding of a strip 15 and subsequent helical welding 16 of the edges of the strip. The process is also referred to as "spiral welding".

Figure 4:
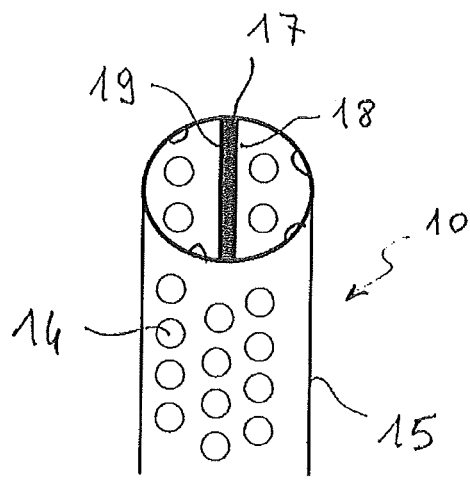
FIG. 4 shows an embodiment of a perforated tube which is an alternative to that shown in FIG. 3.

FIG. 4 shows, instead, an embodiment of the tube 10 with a longitudinal welding 17 (simple longitudinal welding).

It should be noted that both the helical weld 16 and the longitudinal weld 17 are butt welds, i.e. without edges overlapping. FIG. 4 in particular shows that the longitudinal weld 17 is performed without overlapping the edges 18 and 19 of the perforated strip 15. Moreover, as can be seen in the figure, the holes 14 are distributed over the entire side surface of the tube 10.

Figure 5:
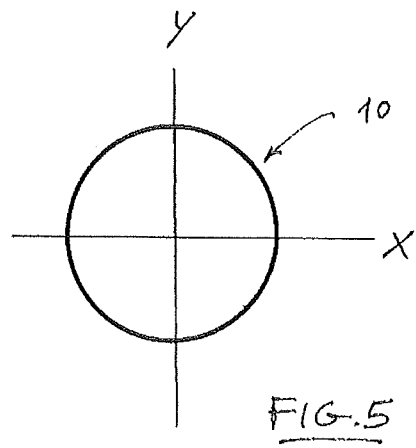
FIGS. 5 and 6 show examples of the cross-section of the tubes.
Figure 6:
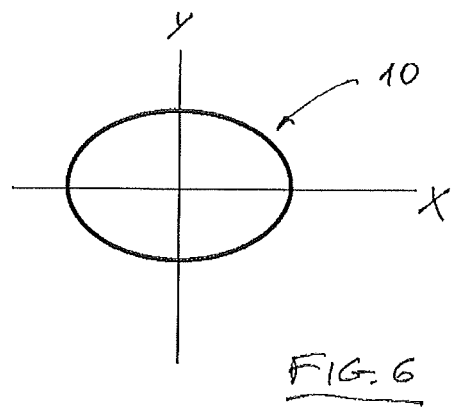
Figure 7:
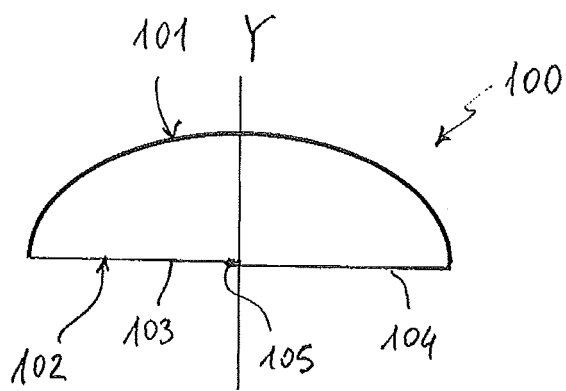
FIGS. 7 and 8 show a solution according to the prior art, FIG. 8 being a detail of FIG. 7.
Figure 8:
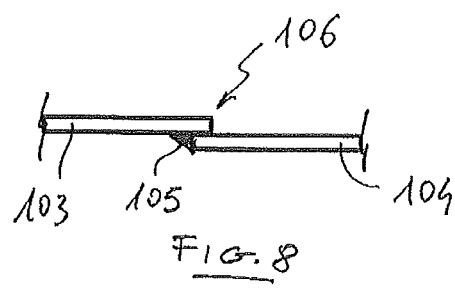

FIGS. 5 and 6 show two examples of cross-sectional views of a tube 10, according to preferred embodiments, with a circular cross-section (FIG. 5) and elliptical cross-section (FIG. 6), respectively. The cross-section of the tube is symmetrical relative to two axes X, Y which are perpendicular to each other.

Preferably, said tubes 10 are commercial tubes, which are serially produced.

Figure 9:
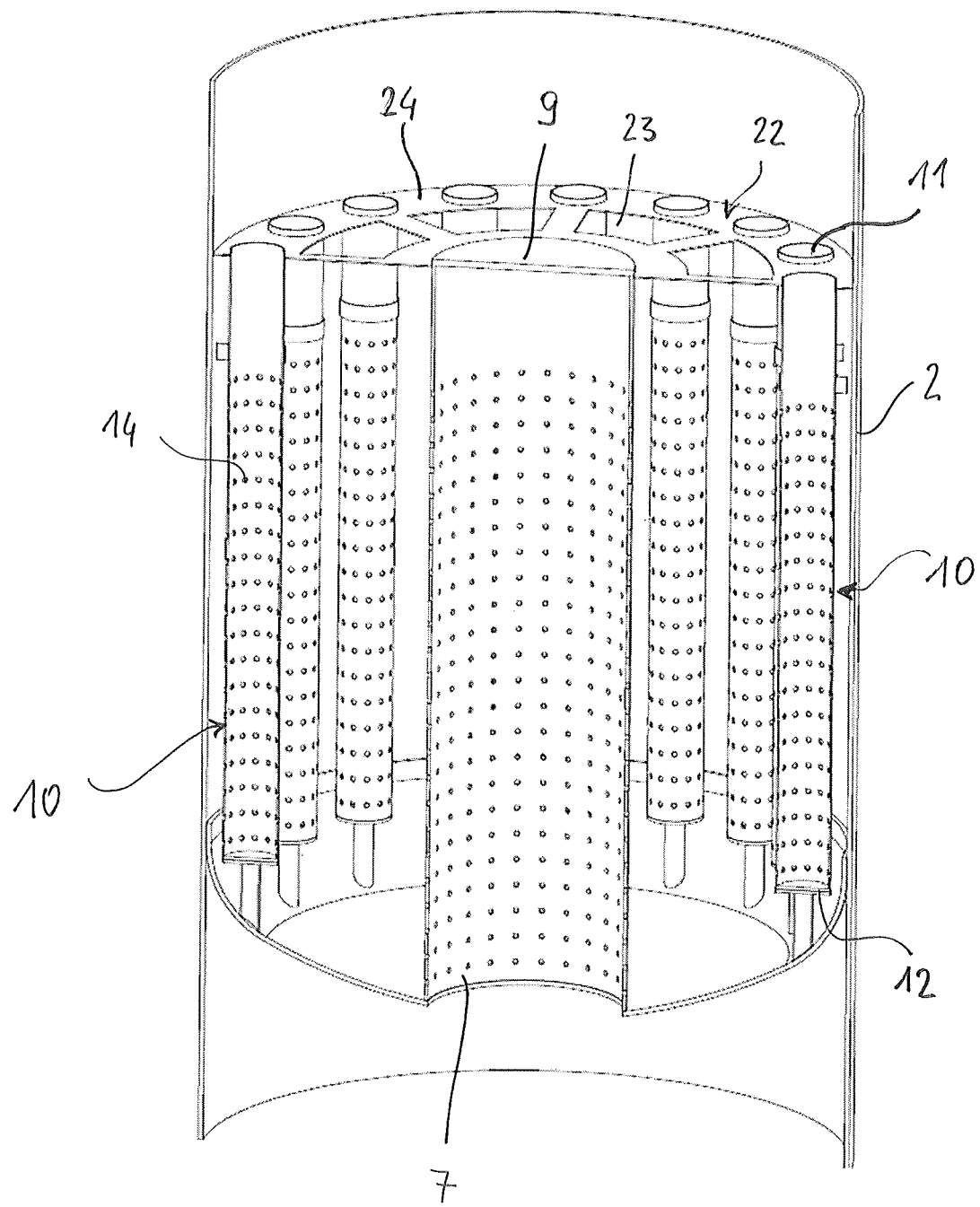
FIG. 9 shows an axonometric view of a reactor according to an embodiment of the invention.

FIG. 9 shows a preferred embodiment comprising a top cover 22 for the catalytic bed, which supports the tubes 10 and comprises openings 23 to allow a partially axial flow (flow 20*a* in FIG. 1). The outer ring 24 of said cover 22 operates substantially as a supporting and retaining ring for the tubes 10.

The wall 6, which is substantially formed by the tubes 10 described above, has the function of both favouring a uniform distribution of the gaseous flow of reagents 20 inside the catalytic bed 5 and of containing and mechanically supporting the catalytic bed 5.

The inner wall 7 for example is a perforated central tube with a closing cover 9 and defines a collecting chamber 8 for the reaction products. The arrows shown in FIG. 1 indicate the paths followed by the gases inside the reactor and in particular through the catalytic bed 5.

During operation, the reagent gases 20 enter the catalytic bed partly (flow 20*a*) with an axial flow through the open top part of the bed, and partly (flow 20*b*) with a radial flow through the perforated tubes 10. The reaction products are collected inside the chamber 8, forming the output flow 21.

The invention claimed is:

1. A radial flow or an axial-radial flow catalytic chemical reactor, comprising:
 a cylindrical shell;
 at least one catalytic bed; and
 a plurality of perforated tubes that are arranged around the at least one catalytic bed to form a distributor of reagents into said at least one catalytic bed;
 at least one ring that supports said plurality of perforated tubes;
 wherein each of said plurality of perforated tubes is cylindrical and has a circular cross-section; and each of said plurality of perforated tubes has a ratio between a wall thickness thereof and a diameter thereof that is less than or equal to 1/10; or
 wherein each of said plurality of perforated tubes has a flattened cross-section, an oval cross-section, or a substantially elliptical cross-section; and each of said plurality of perforated tubes has a ratio between a wall thickness thereof and a perimeter of the flattened cross-section, the oval cross-section, or the substantially elliptical cross-section that is less than or equal to 1/30;
 wherein each of said plurality of perforated tubes is perforated in a substantially uniform manner over an entire side surface thereof;
 wherein each of said plurality of perforated tubes includes holes with a diameter of at least 1 mm;
 wherein each of said plurality of perforated tubes include an open end in communication with an inlet of a gaseous flow of reagents in the catalytic chemical reactor, and a closed end opposite to said inlet end;
 wherein each of said plurality of perforated tubes includes a butt welded perforated strip or a butt welded perforated metal sheet.

2. The radial flow or axial-radial flow catalytic chemical reactor of claim 1, wherein the butt welded perforated strip or the butt welded perforated metal sheet is automatically butt welded.

3. The radial flow or axial-radial flow catalytic chemical reactor of claim 1, wherein said butt welded perforated strip is helically wound and helically welded.

4. The radial flow or axial-radial flow catalytic chemical reactor of claim 1, wherein said butt weld of each of said plurality of perforated tubes includes a straight longitudinal butt weld.

5. The radial flow or axial-radial flow catalytic chemical reactor of claim 1, wherein said ratio is less than or equal to 1/20.

6. The radial flow or axial-radial flow catalytic chemical reactor of claim 1, wherein said ratio is less than or equal to 1/60.

7. The radial flow or axial-radial flow catalytic chemical reactor of claim 1, wherein said plurality of perforated tubes include commercial tubes.

8. The radial flow or axial-radial flow catalytic chemical reactor of claim 7, wherein said commercial tubes include drainage tubes.

9. The radial flow or axial-radial flow catalytic chemical reactor of claim 1, wherein said plurality of perforated tubes extend along a longitudinal axis of said at least one catalytic bed and are in a ring arrangement to form a wall around said at least one catalytic bed.

10. The radial flow or axial-radial flow catalytic chemical reactor of claim 1, wherein said diameter of said holes is not greater than 5 mm.

11. The radial flow or axial-radial flow catalytic chemical reactor of claim 1, wherein said at least one ring includes an outer ring of a cover of the at least one catalytic bed.

12. The radial flow or axial-radial flow catalytic chemical reactor of claim 1 wherein each of the plurality of perforated tubes includes stainless steel or a nickel-chromium alloy.

* * * * *